US008235705B2

(12) United States Patent
Kurakake et al.

(10) Patent No.: US 8,235,705 B2
(45) Date of Patent: Aug. 7, 2012

(54) APPARATUS FOR PRODUCING A SULFUR CONCRETE SUBSTANCE

(75) Inventors: Minoru Kurakake, Tokyo (JP);
Masaaki Chatani, Muroran (JP);
Yoshifumi Tominaga, Takeo (JP);
Yasunori Yamaguchi, Takeo (JP)

(73) Assignees: Nippon Oil Corporation, Muroran (JP);
Fuji Concrete Industry Co., Ltd., Takeo (JP)

( * ) Notice: Subject to any disclaimer, the term of this patent is extended or adjusted under 35 U.S.C. 154(b) by 25 days.

(21) Appl. No.: 12/891,575

(22) Filed: Sep. 27, 2010

(65) Prior Publication Data

US 2011/0012289 A1   Jan. 20, 2011

Related U.S. Application Data

(63) Continuation of application No. PCT/JP2009/055784, filed on Mar. 24, 2009.

(30) Foreign Application Priority Data

Mar. 25, 2008   (JP) ................................ 2008-078240

(51) Int. Cl.
*B29C 45/13* (2006.01)
(52) U.S. Cl. .................. 425/550; 264/328.4; 264/328.8; 366/51; 366/65; 366/190; 366/193; 425/551; 425/562; 425/583
(58) Field of Classification Search .................. 264/229, 264/328.4, 328.8, 328.17; 366/51, 65, 76.1, 366/76.6, 76.7, 76.92, 76.93, 77, 182.2, 182.3, 366/182.4, 190, 192, 193; 425/550, 551, 425/562, 574, 583
See application file for complete search history.

(56) References Cited

U.S. PATENT DOCUMENTS 4,005,167 A * 1/1977 Stern ........................ 264/328.17
(Continued)

FOREIGN PATENT DOCUMENTS

JP     2000072523 A    3/2000
(Continued)

OTHER PUBLICATIONS

Translation of IPRP (International Preliminary Report on Patentability) for International Patent Application No. PCT/JP2009/055784 (Mailed Nov. 18, 2010).

*Primary Examiner* — Tim Heitbrink
(74) *Attorney, Agent, or Firm* — Baker & Hostetler LLP

(57) ABSTRACT

A sulfur-containing material in a melt state is stored in material hopper 1 heated to a temperature within a preset temperature range of which a lower limit is equal to or above a melting point of sulfur. The stored sulfur-containing material is sucked by pressure generators 2a, 2b and pulled out into cylinders 11a, 11b heated to a temperature within the preset temperature range. The pulled out sulfur-containing material is pushed out from the cylinders under predetermined pressure applied by the pressure generator, and thereafter, the resultant material is injected from injection port 24 into mold 5 having therein a cavity which can be hermetically sealed and the mold being heated to a temperature within the preset temperature range. The injection port of the mold after the sulfur-containing material is fully injected in the cavity is closed. By stopping heating of the mold, the sulfur-containing material injected in the cavity is slowly cooled. After that, a modified sulfur concrete substance formed by cooling and solidifying the sulfur-containing material in the cavity is taken out from the mold.

7 Claims, 13 Drawing Sheets

U.S. PATENT DOCUMENTS

| | | | | |
|---|---|---|---|---|
| 4,029,454 A * | 6/1977 | Monnet | ............ | 425/130 |
| 4,898,714 A * | 2/1990 | Urban et al. | ............ | 366/159.1 |
| 5,034,177 A * | 7/1991 | Niimi et al. | ............ | 264/331.21 |
| 5,183,621 A * | 2/1993 | Yukihiro et al. | ............ | 264/297.2 |
| 7,422,426 B2 * | 9/2008 | Saeki et al. | ............ | 425/573 |
| 7,524,184 B2 * | 4/2009 | Hsu | ............ | 425/570 |
| 2002/0164394 A1 * | 11/2002 | Coscia | ............ | 425/562 |
| 2003/0075833 A1 * | 4/2003 | Thomson | ............ | 264/328.17 |
| 2005/0012243 A1 * | 1/2005 | Saeki et al. | ............ | 264/328.8 |

FOREIGN PATENT DOCUMENTS

| | | |
|---|---|---|
| JP | 2000281425 A | 10/2000 |
| JP | 2001030213 A | 2/2001 |
| JP | 2001261425 A | 9/2001 |
| JP | 2004160693 A | 6/2004 |
| JP | 2005082475 A | 3/2005 |
| JP | 2006212801 A | 8/2006 |
| JP | 2006315314 | 11/2006 |
| JP | 2007203486 A | 8/2007 |

* cited by examiner

APPARATUS FOR PRODUCING A SULFUR CONCRETE SUBSTANCE

CROSS-REFERENCE TO RELATED APPLICATIONS

This application is a Continuation of International Patent Application No. PCT/JP2009/055784, filed on Mar. 24, 2009, which claims priority to foreign Patent Application No. JP 2008-078240, filed on Mar. 25, 2008, the disclosures of which are incorporated herein by reference in their entirety.

FIELD OF THE INVENTION

The present invention relates to a modified sulfur concrete substance producing method of forming a modified sulfur concrete substance by injecting a sulfur-containing material in a melt state, under predetermined pressure, into a mold having therein a cavity which can be hermetically sealed and the mold being heated to a temperature within a preset temperature range, and thereafter, making the material in the cavity cooled and solidified, and to a producing apparatus used to execute the method.

BACKGROUND OF THE INVENTION

Generally, concrete obtained by combining aggregate by cement is used as a civil-engineering material and construction material. The sulfur recently receives an attention due to the characteristics that the sulfur is a solid at room temperature while melted upon being heated to about 119° C. to 159° C., and it is attempted that the sulfur is utilized as a civil-engineering material and a construction material by mixing a predetermined sample or predetermined samples in it. It is known that the sulfur-containing material using the sulfur has high strength, an excellent water-sealing property and high acid resistance, as compared with usual concrete employing cement. Further, since the sulfur-containing material is apparently similar to a usual concrete in finishing and handling, sometimes the solidified material is called sulfur concrete substance.

Since the sulfur has ignition property and is dealt with a hazardous material, it is difficult to perform construction by melting, casting and solidifying the sulfur material on site. Therefore, in order to improve such a situation, it is attempted that the sulfur is denatured to produce modified sulfur by mixing a sulfur modifying agent as an additive into molten sulfur. Further, it is attempted that a modified sulfur intermediate material in a melt state is produced by mixing the modified sulfur and fine powders, and a modified sulfur concrete substance is produced by mixing the modified sulfur intermediate material with the aggregate and solidifying the mixture.

Further, in order to form the sulfur concrete substance or the modified sulfur concrete substance by making the sulfur-containing material (or the modified sulfur intermediate material) in the melt state cooled and solidified, the sulfur containing material is injected into a mold having a predetermined shape, and thereafter, is cooled and solidified.

As a technique of producing a sulfur-concrete product which can be immediately removed from the mold after hermetic sealing and has a smooth surface and excellent durability, a technique is disclosed in which a mixture obtained by mixing from 1 to 20 volume parts of mineral fine powders to 1 volume part of the sulfur is heated to the melting point of sulfur or higher and hermetically sealed, thereby forming a compact having self molding performance.

However, the sulfur-containing material in the melt state start to solidify at the time point when the temperature is below solidification temperature (about 119° C.) of the sulfur and solidifies to have high strength which is equal to or higher than that of usual concrete. Conventionally, when the sulfur-containing material in the melt state solidifies, a part which is in contact with the mold when the material is poured into the mold is cooled rapidly, so that a problem occurs such that the surface of the sulfur concrete substance or the modified sulfur concrete substance removed from the mold is rough. In addition, it is difficult to manufacture a product having high precision in shape.

Furthermore, when a cylindrical product such as a hume pipe or a manhole is manufactured by usual concrete, a producing method called centrifugal molding of injecting the concrete into a cylindrical mold while rotating and vibrating the mold so as to press the material against the inner peripheral surface of the mold by centrifugal force and vibration is employed. In this case, a skilled hand is needed for finishing of the inner peripheral surface of the cylindrical product, and it takes long time. First of all, since the sulfur-containing material in the melt state start to solidify at the time point when the temperature is below the solidification temperature (about 119° C.) of the sulfur, a product may not be manufactured by using the centrifugal molding of pressing the material against the inner peripheral surface of the mold by using the centrifugal force.

SUMMARY OF THE INVENTION

In view of the above described problem, one aspect of the present invention provides a modified sulfur concrete substance producing method of forming a modified sulfur concrete substance by injecting a sulfur-containing material in a melt state, under predetermined pressure, into a mold having therein a cavity of a predetermined shape, and thereafter, making the material in the cavity cooled and solidified, and a producing apparatus used to execute the method.

In order to achieve this aspect, a modified sulfur concrete substance producing method of an embodiment of the present invention includes: a step of storing a sulfur-containing material in a melt state in a material hopper heated to a temperature within a preset temperature range of which a lower limit is equal to or above a melting point of sulfur; a step of sucking the sulfur-containing material stored in the material hopper by a pressure generator and pulling out the sulfur-containing material into a cylinder heated to a temperature within the preset temperature range; a step of pushing out the sulfur-containing material pulled out into the cylinder, from the cylinder under a predetermined pressure applied by the pressure generator and injecting the sulfur-containing material from an injection port of a mold, into the mold having therein a cavity which can be hermetically sealed and the mold being heated to a temperature within a preset temperature range; a step of closing the injection port of the mold after the sulfur-containing material is fully injected in the cavity; a step of slowly cooling the sulfur-containing material injected in the cavity by stopping heating of the mold; and a step of taking out a modified sulfur concrete substance formed by cooling and solidifying the sulfur-containing material in the cavity, from the mold.

By the above-mentioned method, a sulfur-containing material in a melt state is stored in a material hopper heated to a temperature within the preset temperature range of which a lower limit is equal to or above the melting point of sulfur. The stored sulfur-containing material is sucked by pressure generators and pulled out into cylinders heated to a temperature within the preset temperature range. The pulled out sulfur-containing material is pushed out from the cylinder under the predetermined pressure applied by the pressure generator to thereby inject the material from the injection port of the mold, into the mold having therein a cavity which can be hermetically sealed and the mold being heated to a temperature within the preset temperature range. The injection port of the mold is closed after the sulfur-containing material is fully injected in the cavity. By stopping heating of the mold, the sulfur-containing material injected in the cavity is slowly cooled, so that the modified sulfur concrete substance formed by cooling and solidifying the sulfur-containing material in the cavity is taken out from the mold. After that, the sulfur-containing material in the melt state is injected under the predetermined pressure into the mold having therein a cavity which can be hermetically sealed and the mold being heated to a temperature within the preset temperature range of which a lower limit is equal to or above the melting point of sulfur, and thereafter, the material is cooled and solidified in the cavity, thereby forming a modified sulfur concrete substance. Therefore, even if the shape of a product made by the modified sulfur concrete substance is complicated, a product of high precision can be manufactured by the shape of the cavity in the mold. In addition, since the precision of the product is depend on the shape of the mold, regardless of the wideness of a finished surface of the mold and complication of the shape of the mold, uniform products can be manufactured. Further, surface finishing of a product is not required, so that a skilled person is not needed.

The sulfur-containing material stored in the material hopper is agitated by an agitating blade provided in the material hopper. By agitating the sulfur-containing material stored in the material hopper with the agitating blade, separation of the components is prevented, so that the uniform sulfur-containing material is injected to the mold. Therefore, intensity of solidification of the modified sulfur concrete substance can be increased.

Further, in the step of injecting the sulfur-containing material into the mold, the material is injected while applying vibration to the mold. By injecting the sulfur-containing material while applying vibration to the mold, even if the sulfur-containing material is a material having low flowability, the material can be injected into the mold.

A modified sulfur concrete substance producing apparatus of an embodiment of the present invention includes: a material hopper heated to a temperature within the preset temperature range of which a lower limit is equal to or above the melting point of sulfur, and which stores a sulfur-containing material in a melt state on the inside thereof; a pressure generator which suck the sulfur-containing material stored in the material hopper, pulls out the material into a cylinder heated to a temperature within the preset temperature range, and thereafter, pushes out the sulfur-containing material pulled out into the cylinder, from the cylinder under predetermined pressure; an opening and closing plate provided at each of a pull port for pulling out the sulfur-containing material in the material hopper into the cylinder and a push port for pushing out the sulfur-containing material from the cylinder, which interlockingly moves to alternately open and close the pull port and the push port; an injection hose whose base end is connected to the push port for the sulfur-containing material from the cylinder, the injection hose being heated to a temperature within the preset temperature range, and in which the sulfur-containing material flows; a mold whose injection port of a sulfur-containing material is connected to the other end of the injection hose, which has therein a cavity which is communicated with the injection port and also can be hermetically sealed, which has an air-release hole communicated with the cavity, and the mold being heated to a temperature within the preset temperature range; and an interrupting mechanism provided for the injection port in the mold, which closes the injection port after the sulfur-containing material is fully injected into the cavity.

With such a configuration, the sulfur-containing material in a melt state heated to a temperature within the preset temperature range of which a lower limit is equal to or above the melting point of sulfur is stored on the inside of the material hopper. By the pressure generator, the sulfur-containing material stored in the material hopper is sucked and pulled out into a cylinder heated to a temperature within the preset temperature range. The sulfur-containing material pulled out into the cylinder is pushed out from the cylinder under the predetermined pressure. By the opening and closing plates provided at each of the pull port for pulling out the sulfur-containing material in the material hopper into the cylinder and the push port for pushing out the sulfur-containing material from the cylinder, which interlockingly moves, so that the pull port and the push port are alternately opened and closed. The injection hose is heated to a temperature within the preset temperature range and the sulfur-containing material flows therein, the base end of the injection hose is connected to the push port for the sulfur-containing material from the cylinder. The other end of the injection hose is connected to the injection port for the sulfur-containing material of the mold having therein a cavity which is communicated with the injection port and can be hermetically sealed, having an air-release hole communicated with the cavity, and the mold being heated to a temperature within the preset temperature range. By the interrupting mechanism provided for the injection port, the injection port of the mold is closed after the sulfur-containing material is fully injected into the cavity. With such a configuration, a sulfur-containing material in a melt state is injected under predetermined pressure into the mold having therein a cavity which can be hermetically sealed, and the mold being heated to a temperature within the preset temperature range of which a lower limit is equal to or above a melting point of sulfur. After that, the sulfur-containing material is cooled and solidified in the cavity, thereby forming a modified sulfur concrete substance. Therefore, even if the shape of a product made by the modified sulfur concrete substance is complicated, a product of high precision can be manufactured by the shape of the cavity in the mold. Further, since the precision of the product is depend on the shape of the mold, regardless of the wideness of the finished surface of the mold and the complication of the shape of the mold, uniform products can be manufactured. Furthermore, the surface finishing of a product is not required, so that a skilled person is not needed.

Each of the material hopper, the cylinder of the pressure generator, the injection hose, and the mold is provided with heating means so as to be heated to a temperature within the preset temperature range of which a lower limit is equal to or above a melting point of sulfur. With the configuration, by the heating means provided for each of the material hopper, the cylinder of the pressure generator, the injection hose, and the mold, each of the components is heated to a temperature within the preset temperature range of which a lower limit is equal to or above a melting point of the sulfur material. Therefore, the sulfur-containing material can be maintained in a melt state on the inside of each of the components.

Further, each of the periphery of the material hopper, the cylinder of the pressure generator, the injection hose, and the mold is covered with a box-shaped member to increase atmospheric temperature in the box-shaped member so as to heat each of the components to a temperature within the preset temperature range of which a lower limit is equal to or above a melting point of the sulfur material. With the configuration, by surrounding the periphery of the material hopper, the cylinder of the pressure generator, the injection hose, and the mold with a box-shaped member and increasing atmospheric temperature in the box-shaped member, each of the components is heated to a temperature within the preset temperature range of which a lower limit is equal to or above the melting point of sulfur. Therefore, in each of the components, the sulfur-containing material can be maintained in a melt state.

Further, a plurality of pressure generators is provided in parallel to the material hopper, alternately executes operation of sucking the sulfur-containing material stored in the material hopper and pulling out it into the cylinder and an operation of pushing out the sulfur-containing material pulled out into the cylinder, from the cylinder under predetermined pressure. By the plurality of pressure generators provided in parallel to the material hopper, the operation of sucking the sulfur-containing material stored in the material hopper and pulling out it into the cylinder and the operation of pushing out the sulfur-containing material pulled out into the cylinder, from the cylinder under predetermined pressure can be executed alternately. Therefore, in the case where the number of the pressure generators is two (two cylinders), the operation of pulling out the sulfur-containing material from the material hopper into the cylinder and the operation of pushing out the sulfur-containing material from the cylinder can be executed simultaneously, so that the time for injecting the sulfur-containing material to the mold can be shortened.

The opening and closing plate is housed in a plate cover as a casing covering the periphery of the opening and closing plate in the longitudinal direction except for portions of a pull port for pulling out the sulfur-containing material from the material hopper and a push port for pushing out the sulfur-containing material from the cylinder, and the opening and closing plate slides in the plate cover. With the configuration, the opening and closing plate housed in the plate cover as the casing covering the periphery of the opening and closing plate in the longitudinal direction, slides in the plate cover, thereby preventing the sulfur-containing material remaining in the portions of the pull port for the sulfur-containing material from material hopper and the push port for the sulfur-containing material from the cylinder from spilling over in the periphery. Therefore, the sulfur-containing material can be prevented from being adhered and solidified in the opening and closing plate and in the vicinity of a lower part of the material hopper, so that the maintenance can be facilitated.

Further, the cylinder of the pressure generator has a structure which can be divided into upper and lower parts along the longitudinal direction thereof. With the structure, at the time of maintenance, the cylinder of the pressure generator can be divided into the upper and lower parts along the longitudinal direction. Therefore, the maintenance can be facilitated.

Further, an agitating blade for agitating the sulfur-containing material stored in the material hopper is provided on the inside of the material hopper. By agitating the sulfur-containing material stored in the material hopper with the agitating blade provided on the inside of the material hopper, separation of the components is prevented, so that the uniform sulfur-containing material is injected to the mold. Therefore, intensity of solidification of the modified sulfur concrete substance can be increased.

DETAILED DESCRIPTION

Preferred embodiments of the present invention will be described in detail with reference to the accompanying drawings.

Figure 1:
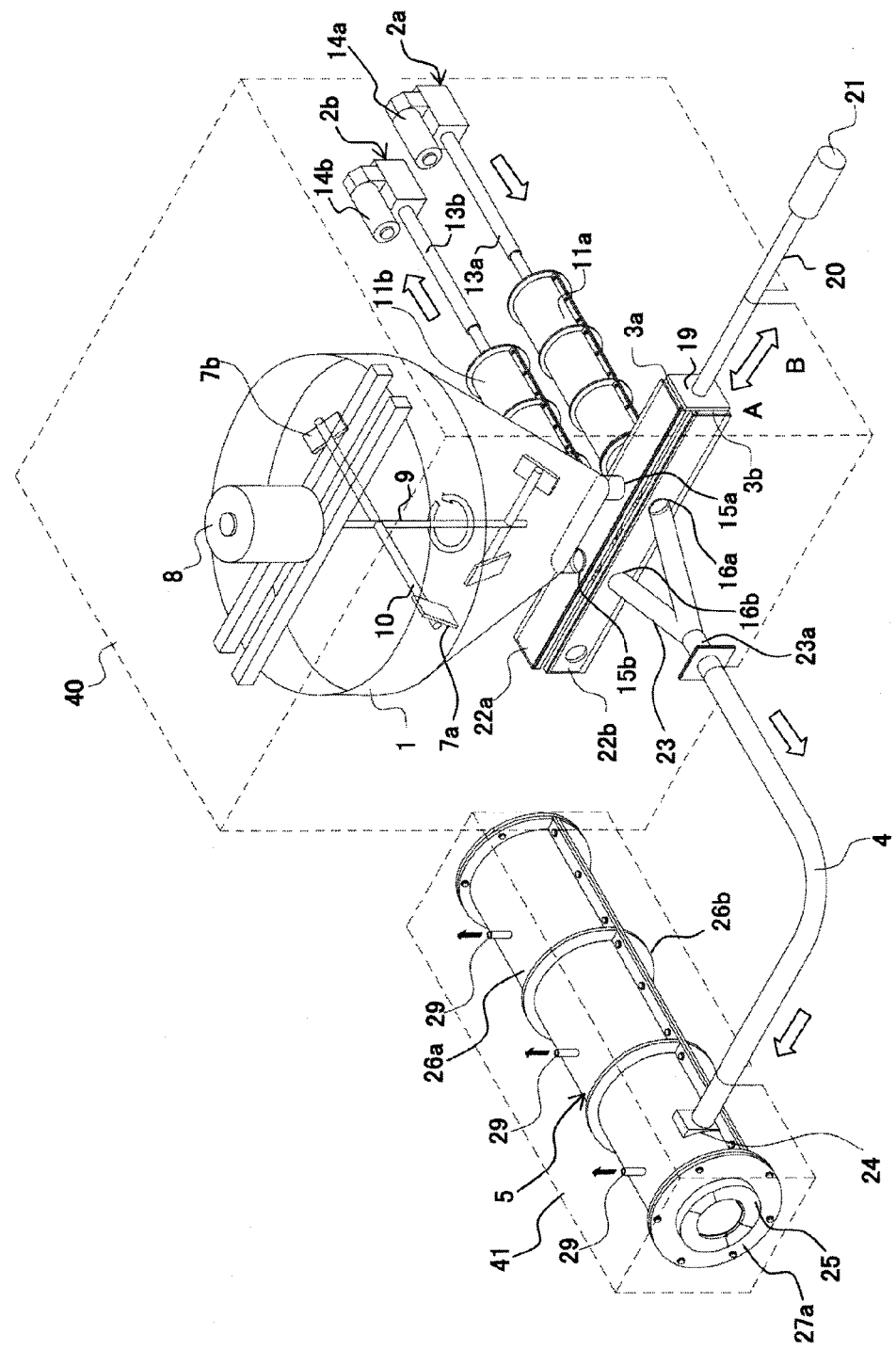
FIG. 1 is a perspective view illustrating an embodiment of a modified sulfur concrete substance producing apparatus according to the present invention.

FIG. 1 is a perspective view illustrating an embodiment of a modified sulfur concrete substance producing apparatus according to the present invention. The apparatus is used for executing a modified sulfur concrete substance producing method of forming a modified sulfur concrete substance by injecting a sulfur-containing material in a melt state, under predetermined pressure, into a mold having therein a cavity which can be hermetically sealed and the mold being heated to a temperature within a preset temperature range of which a lower limit is equal to or above a melting point of sulfur, and thereafter, making the material in the cavity cooled and solidified, thereby forming a modified sulfur concrete substance. The apparatus has a material hopper 1, pressure generators 2a and 2b, opening and closing plates 3a and 3b, an injection hose 4, a mold 5, and an interrupting mechanism 6 (refer to FIG. 9).

Figure 2:
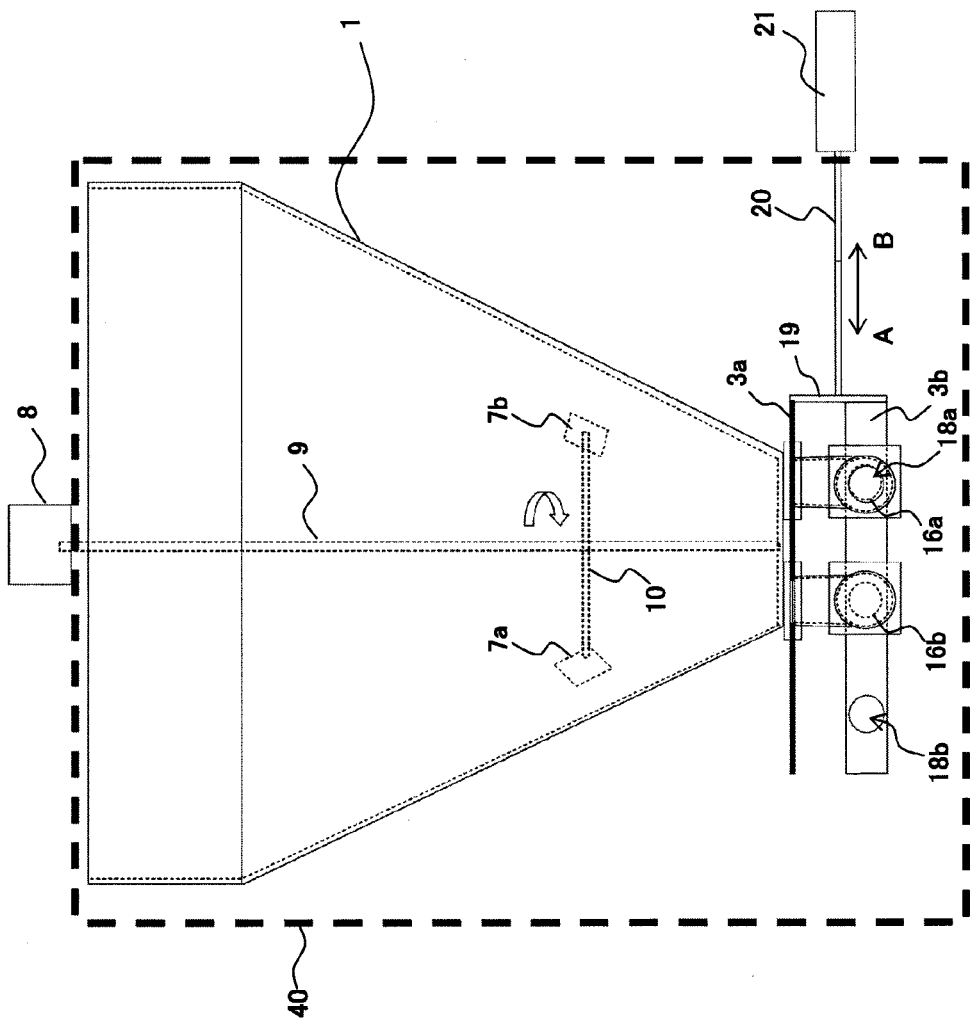
FIG. 2 is an enlarged front view of a material hopper illustrated in FIG. 1.
Figure 3:
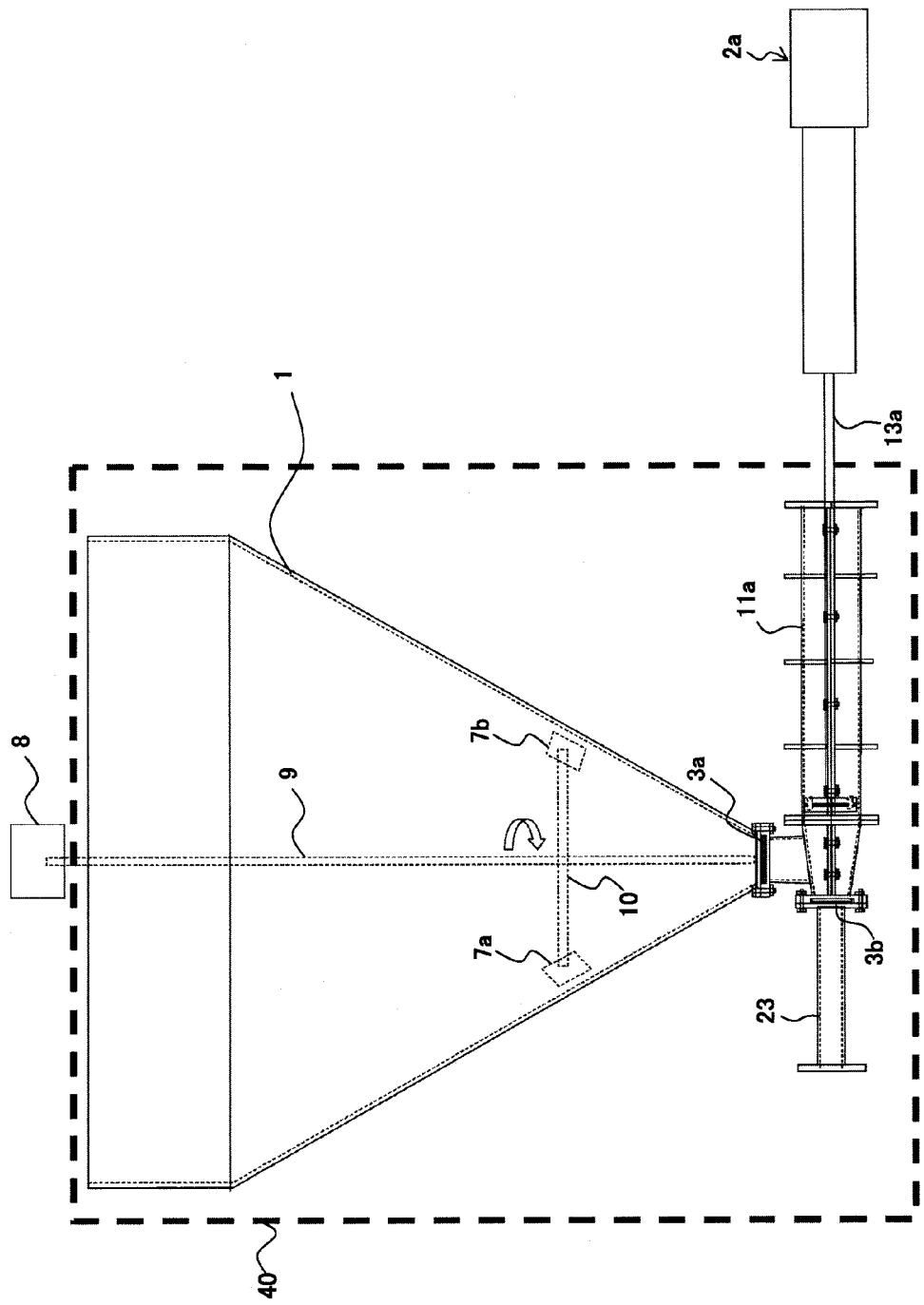
FIG. 3 is an enlarged side view of the material hopper illustrated in FIG. 1.

Material hopper 1 stores a sulfur-containing material in a melt state on the inside. As illustrated in FIGS. 2 and 3, material hopper 1 is made of a metal and formed in a funnel shape, and the volume of material hopper 1 is, for example, about 1.0 m$^3$. The peripheral portion of material hopper 1 is provided with heating means such as an electric heater, a hot-air heater, or an oil heater and is covered with a heat insulating material. Material hopper 1 is heated to a temperature within the preset temperature range of which a lower limit is equal to or above the melting point (119° C.) of sulfur. The preset temperature range of heating is, preferably, about 135 to 150° C. In the range, the sulfur-containing material in the melt state stored in material hopper 1 is held in the melt state without solidifying.

Material hopper 1 has therein agitating blades 7a and 7b. Agitating blades 7a and 7b agitate the sulfur-containing material stored in material hopper 1 and, as illustrated in FIGS. 2 and 3, are attached at both ends of an arm shaft 10 orthogonal to a rotary shaft 9 extending toward a downward direction from a rotation driving source 8 such as an electric motor disposed on the top face of material hopper 1. By rotating agitating blades 7a and 7b by driving rotation driving source 8, the sulfur-containing material stored in material hopper 1 is agitated and, without separation of the materials, the uniform sulfur-containing material can be injected into mold 5 which is described later. Further, by setting the mounting angle of agitating blades 7a and 7b so that agitating blades 7a and 7b are twisted downward like propeller blades, the sulfur-containing material stored in material hopper 1 can be sent downward while being agitated.

The sulfur-containing material is explained below. The sulfur-containing material is called a sulfur concrete substance produced by, using the characteristics that the sulfur is solid at room temperature while melted upon being heated to about 119 to 159° C., mixing sands, gravels, coal ashes or the like with the sulfur melted by being heated to a temperature within the preset temperature range of which a lower limit is equal to or above 119° C. and kneading the mixed material while maintaining the temperature at about 119 to 159° C., and thereafter, cooling and hardening the kneaded material. The sulfur-containing material may be called a modified sulfur concrete substance produced by mixing the sulfur melted by being similarly heated to a temperature within the preset temperature range of which a lower limit is equal to or above 119° C. with a sulfur modifying agent which denatures the melted sulfur to produce modified sulfur, and mixing sands, gravels, coal ashes or the like with the modified sulfur, and kneading the mixed material by being heated in a manner similar to the above, and thereafter, cooling and hardening the knead material. That is, the sulfur-containing material includes the sulfur concrete substance and the modified sulfur concrete substance. As used herein, the term "modified sulfur concrete substance" intends to include, but not limited to, "sulfur concrete substance".

The modified sulfur concrete substance is further described in detail. The modified sulfur concrete substance is produced by using sulfur, a sulfur modifying agent, fine powders, and aggregate as materials. First, the melted sulfur and the sulfur modifying agent are mixed to produce the modified sulfur. Sulfur is usual simple sulfur and is, for example, natural sulfur or sulfur produced by desulfurizing petroleum or natural gas. The sulfur modifier performs modification by denaturing the melted sulfur, for example, polymerizing sulfur. The sulfur modifying agent may be any compound which can polymerize sulfur. For example, the sulfur modifier is olefinic hydrocarbon or diolefin hydrocarbon having carbon number of from 4 to 20, concretely, the sulfur modifier is one of a cyclic olefinic hydrocarbon such as limonene or pinene, aromatic hydrocarbon such as styrene, vinyl toluene, or methylstyrene, and diene hydrocarbon such as dicyclopentadiene (DCPD) and its oligomer, cyclopentadiene, tetrahydroindene (THI), vinylcyclohexene, vinylnorbornene, ethylidene norbornene, or cyclooctadiene, or a mixture of two or more of the hydrocarbons. The sulfur and the sulfur modifying agent are mixed in a state where sulfur is melted, that is, at a temperature range from 119 to 159° C., preferably, from 135 to 150° C.

The modified sulfur can be obtained by melt-mixing the sulfur with sulfur modifying agent. The percent of use of the sulfur modifying agent in this case is, preferably, from 0.1 to 30 percent by mass, more preferably, from 1.0 to 20 percent by mass to the total amount of sulfur and the sulfur modifying agent. The obtained modified sulfur is mixed with fine powders heated to a predetermined temperature (for example, 150° C.), thereby obtaining a modified sulfur intermediate material. As the fine powders, one or more of coal ash, siliceous, silica fume, glass powders, fuel incineration, electrically collected dust and crushed sea shell may be selected.

The obtained modified sulfur intermediate material is mixed with the aggregate heated to, for example, about from 130 to 140° C. in a state where the temperature is maintained at a temperature at which a melt state can be maintained (for example, from 130 to 140° C.). The aggregate is not limited as long as it can be used as aggregate, and aggregate generally used for concrete can be used. Examples of such aggregate are one or more materials selected from the group of natural stones, sands, gravels, siliceous, iron and steel slag, ferronickel slag, copper slag, side product generated at the time of manufacturing a metal, liquid slags, shells and a mixture of the materials. By mixing the modified sulfur intermediate material and the aggregate by using, for example, a kneading unit, the modified sulfur material is produced, and thereafter, by cooling and solidifying the modified sulfur material, a modified sulfur concrete substance is produced. Such a modified sulfur concrete substance can be produced by using, for example, a modified sulfur concrete substance producing system.

In the following description, such a sulfur concrete substance or a modified sulfur concrete substance is heated in the preset temperature range, and the resultant is used as a sulfur-containing material in a melt state.

Figure 7:
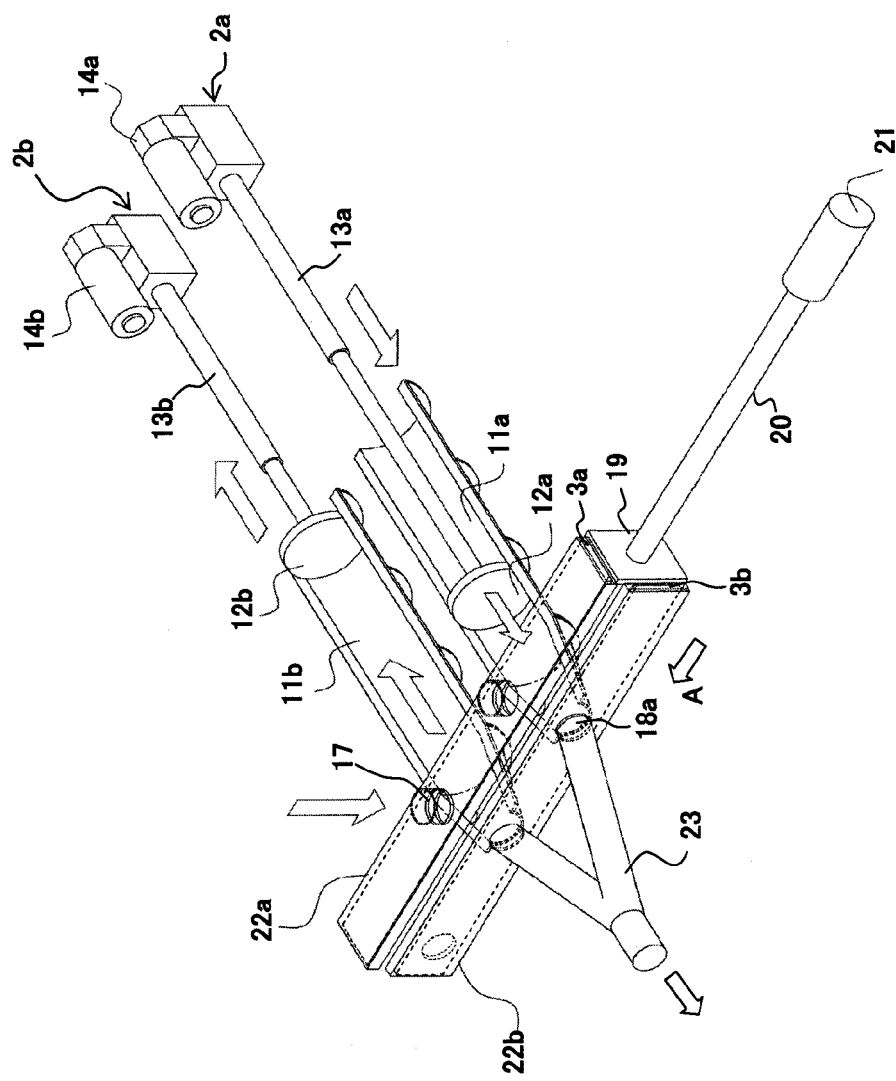
FIG. 7 is a perspective explanatory view illustrating a state where an upper half of a cylinder is exploded, for explaining operation of the pressure generator and an opening and closing plate illustrated in FIG. 1.

In FIG. 1, below material hopper 1, pressure generators 2a and 2b are provided. Pressure generators 2a and 2b are used to suck the sulfur-containing material stored in material hopper 1 and push out the sucked sulfur-containing material under predetermined pressure. Reference numeral 2a denotes a first pressure generator, and reference numeral 2b denotes a second pressure generator. As illustrated in FIG. 7, first pressure generator 2a includes a cylinder 11a having a cylindrical shape, a piston 12a fit in cylinder 11a, a piston rod 13a for pushing/pulling piston 12a, and a driving motor 14a such as an electric motor for making piston rod 13a elongate and contract. Similarly, second pressure generator 2b includes a cylinder 11b having a cylindrical shape, a piston 12b fit in cylinder 11b, a piston rod 13b for pushing/pulling piston 12b, and a driving motor 14b such as an electric motor for making piston rod 13b elongate and contract.

As for dimensions of each of cylinders 11a and 11b, for example, the inside diameter is 130 mm, and a stroke is 600 mm. The pushed out amount of the sulfur-containing material per one time is 7.96 L. A predetermined pressure at the time of pushing out the sulfur-containing material is, for example, 98 kPa (about 1 kg/cm$^2$) or higher and 147 kPa (about 1.5 kg/cm$^2$) or 196 kPa (about 2.0 kg/cm$^2$) or less. Driving motors 14a and 14b may be hydraulic motors.

As illustrated in FIG. 1, the above-mentioned pressure generators 2a and 2b are provided in parallel to the horizontal direction to material hopper 1 (refer to FIG. 4), and can alternately perform operation of sucking a sulfur-containing material stored in material hopper 1 and pulling it out into cylinders 11a and 11b and operation of pushing out, from cylinders 11a and 11b, the sulfur-containing material pulled out into cylinders 11a and 11b under the predetermined pressure.

The peripheral portion of each of cylinders 11a and 11b of pressure generators 2a and 2b is provided with heating means such as an electric heater, a hot-air heater, or an oil heater and is covered with a heat insulating material. Cylinders 11a and 11b are heated to a temperature within a preset temperature range of which a lower limit is equal to or above the melting point (119° C.) of sulfur (for example, about from 135 to 150° C.). In the range, the sulfur-containing material in the melt state, which is pulled out into cylinders 11a and 11b, is held in the melt state without solidifying.

Figure 8:
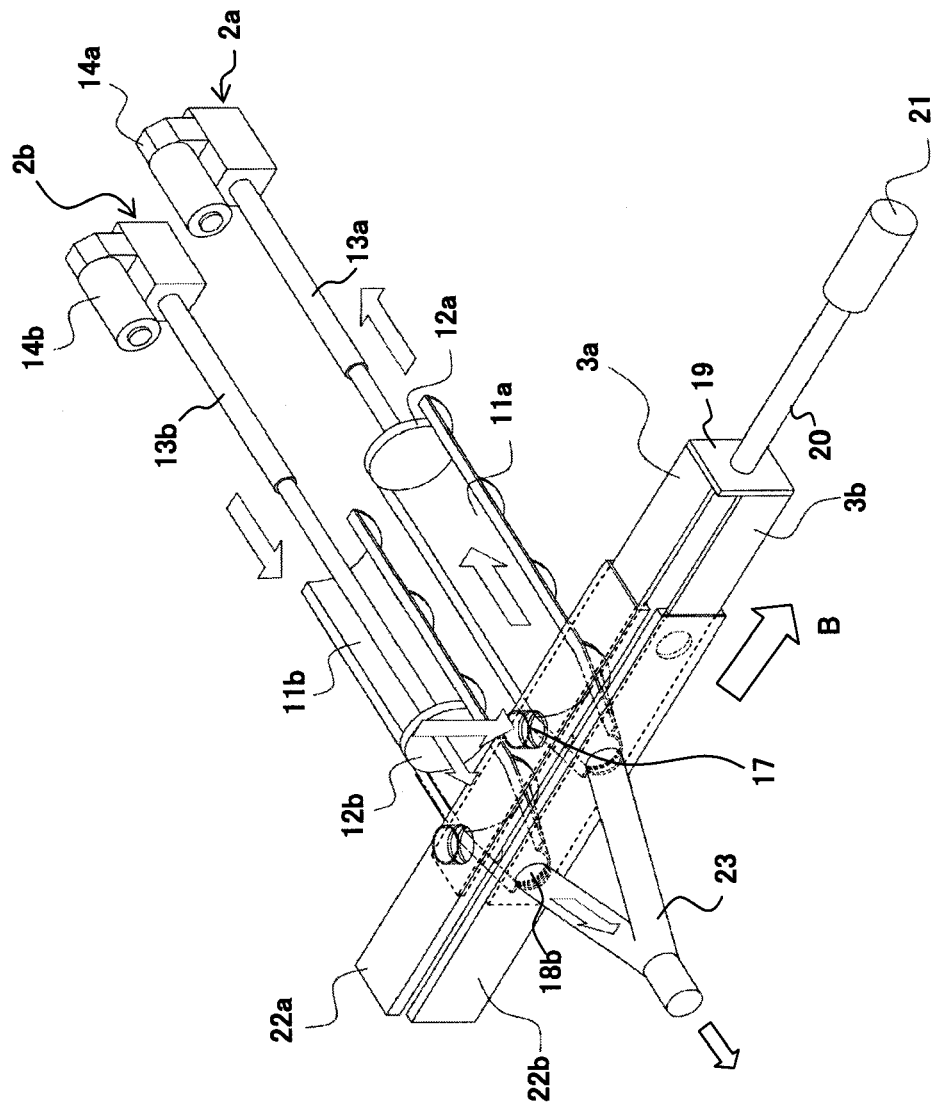
FIG. 8 is similarly a perspective explanatory view illustrating a state where an upper half of a cylinder is exploded, for explaining operation of the pressure generator and the opening and closing plate shown in FIG. 1.

Each of cylinders 11a and 11b of pressure generators 2a and 2b has a structure which can be divided into upper and lower parts along the longitudinal direction thereof, as shown in FIGS. 7 and 8. For example, the cylindrical member is formed in a shape which can be divided into two upper and lower half cylindrical members along the longitudinal direction, which are fastened by bolts, nuts, or the like. With the structure, at the time of maintenance, each of cylinders 11a and 11b of pressure generators 2a and 2b is divided into the two upper and lower parts along the longitudinal direction to clean the inside. Consequently, maintenance can be facilitated.

In a portion where cylinders 11a and 11b of pressure generators 2a and 2b are coupled to the lower part of material hopper 1, opening and closing plates 3a and 3b are provided, as illustrated in FIG. 1. Opening and closing plates 3a and 3b alternately open and close pull ports 15a and 15b for pulling out the sulfur-containing material in material hopper 1 into cylinders 11a and 11b and push ports 16a and 16b for pushing out the sulfur-containing material from cylinders 11a and 11b. Opening and closing plates 3a and 3b are provided for pull ports 15a and 15b and push ports 16a and 16b, respectively. The two opening and closing plates interlockingly move.

Figure 4:
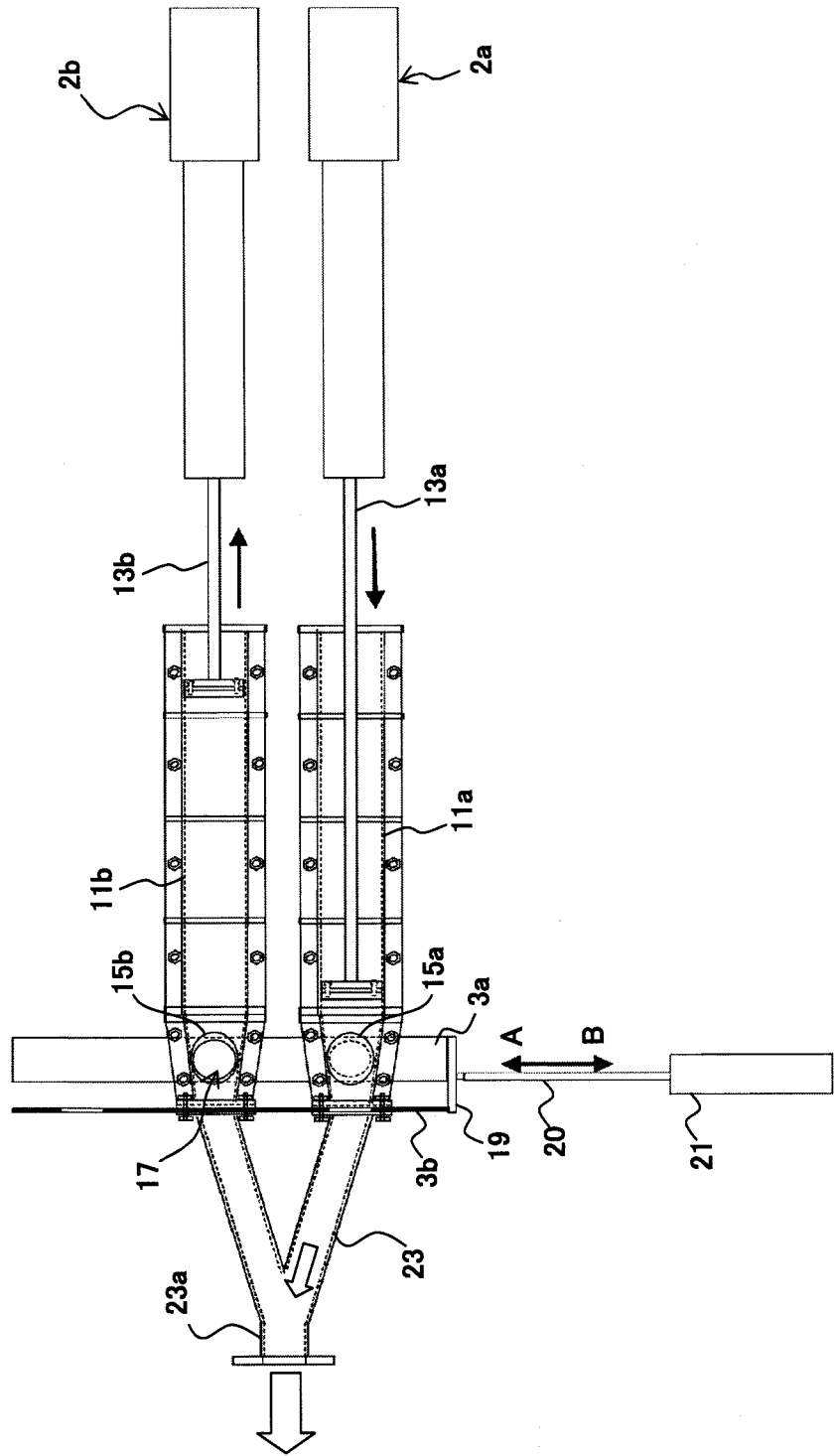
FIG. 4 is an enlarged plan view of a pressure generator illustrated in FIG. 1.

Specifically, pull ports 15a and 15b for the sulfur-containing material are formed so as to be adapted to the interval between cylinders 11a and 11b of pressure generators 2a and 2b at the lower part of material hopper 1. Push ports 16a and 16b for the sulfur-containing material are formed so as to be adapted to the interval between cylinders 11a and 11b at the front end side (refer to FIG. 3) of cylinders 11a and 11b of pressure generators 2a and 2b. As illustrated in FIGS. 2 to 4, each of opening and closing plates 3a and 3b is formed as a member having an elongated plate shape, the length thereof is at least twice of the interval between cylinders 11a and 11b. Further, opening and closing plates 3a and 3b can move in a direction orthogonal to the longitudinal direction of cylinders 11a and 11b. The opening and closing plate which opens and closes pull ports 15a and 15b is set as first opening and closing plate 3a which is disposed so that, in FIG. 3, the plane thereof is positioned in a horizontal plane at the lower part of material hopper 1. The opening and closing plate which opens and closes push ports 16a and 16b is set as second opening and closing plate 3b which is disposed so that, in FIG. 3, the plane thereof is positioned in a vertical plane at the front end of each of cylinders 11a and 11b of pressure generators 2a and 2b.

In first opening and closing plate 3a, as illustrated in FIG. 4, one through hole 17 is provided, for example, at a center portion in the longitudinal direction. When first opening and closing plate 3a moves in the directions of the arrows A and B, through hole 17 matches either pull port 15a or 15b to thereby alternately open or close two pull ports 15a and 15b. In second opening and closing plate 3b, as illustrated in FIG. 2, through holes 18a and 18b are provided, for example, at both ends in the longitudinal direction. When second opening and closing plate 3b moves in the directions of the arrows A and B, through hole 18a as one of the through holes matches one push port 16a to close the other push port 16b in an almost center portion of opening and closing plate 3b. When the other through hole 18b matches the other push port 16b, push port 16a is closed in an almost center portion of opening and closing plate 3b. In such a manner, two push ports 16a and 16b are alternately opened and closed.

In such a state, one end (right end in FIGS. 1 and 2) of each of first and second opening and closing plates 3a and 3b is connected to an end plate 19 having a rectangular shape. An extensible rod 20 is coupled to end plate 19, and a drive cylinder 21 such as an air cylinder is mounted at one end of extensible rod 20. By making extensible rod 20 elongate or contract in the direction of arrow A or B by driving drive cylinder 21, first and second opening and closing plates 3a and 3b move interlockingly in the directions of arrows A and B. As a result, using first and second opening and closing plates 3a and 3b, pull ports 15a and 15b and push ports 16a and 16b can be alternately opened and closed. In this case, one drive cylinder 21 and one extensible rod 20 are sufficient, so that the structure and operation are simplified.

As illustrated in FIGS. 1 and 8, first and second opening and closing plates 3a and 3b are housed in plate covers 22a and 22b as casings covering the periphery of plates in the longitudinal direction except for the portion of pull ports 15a and 15b for the sulfur-containing material from material hopper 1 and push ports 16a and 16b for the sulfur-containing material from cylinders 11a and 11b, and slide in plate covers 22a and 22b. That is, first and second opening and closing plates 3a and 3b are inserted in plate covers 22a and 22b as casings and slide interlockingly in the directions of arrows A and B, thereby preventing the sulfur-containing material remaining in the portion of pull ports 15a and 15b for the sulfur-containing material from material hopper 1 and push ports 16a and 16b for the sulfur-containing material from cylinders 11a and 11b from spilling over in the periphery.

As illustrated in FIGS. 1 and 4, a material introduction pipe 23 having a fork shape is coupled to push ports 16a and 16b for the sulfur-containing material from cylinders 11a and 11b. At one end 23a of material introduction pipe 23, the sulfur-containing material is combined to one pipe and led to injection hose 4 described later.

To push ports 16a and 16b for the sulfur-containing material from cylinders 11a and 11b, the base end portion of injection hose 4 is connected. Injection hose 4 is provided to inject the sulfur-containing material in the melt state pushed out from push ports 16a and 16b for the sulfur-containing material from cylinders 11a and 11b to mold 5 described later. Injection hose 4 is made of a material having heat resistance within the preset temperature range of which a lower limit is equal to or above the melting point of sulfur (about from 135 to 150° C.) and having flexibility. Injection hose 4 is connected to one end 23a of material introduction pipe 23.

The peripheral portion of injection hose 4 is provided with heating means such as an electric heater, a hot-air heater, or an oil heater and is covered with a heat insulating material. Injection hose 4 is heated to a temperature within the preset temperature range of which a lower limit is equal to or above the melting point (119° C.) of sulfur (for example, about from 135 to 150° C.), so that the sulfur-containing material in the melt state led into injection hose 4 is maintained in the melt state without solidifying and flows in injection hose 4.

To the other end of injection hose 4, an injection port 24 of the sulfur-containing material of mold 5 is connected. Mold 5 forms the modified sulfur concrete substance by injecting the sulfur-containing material in the melt state thereinto under the predetermined pressure, and thereafter, making the material cooled and solidified. Mold 5 is made of a metal such as steel or aluminum and is formed in a shape adapted to the shape of a modified sulfur concrete substance product to be manufactured. For example, mold 5 illustrated in FIG. 1 is used to manufacture a cylindrical modified sulfur concrete substance product such as a Hume pipe or manhole.

Figure 5:
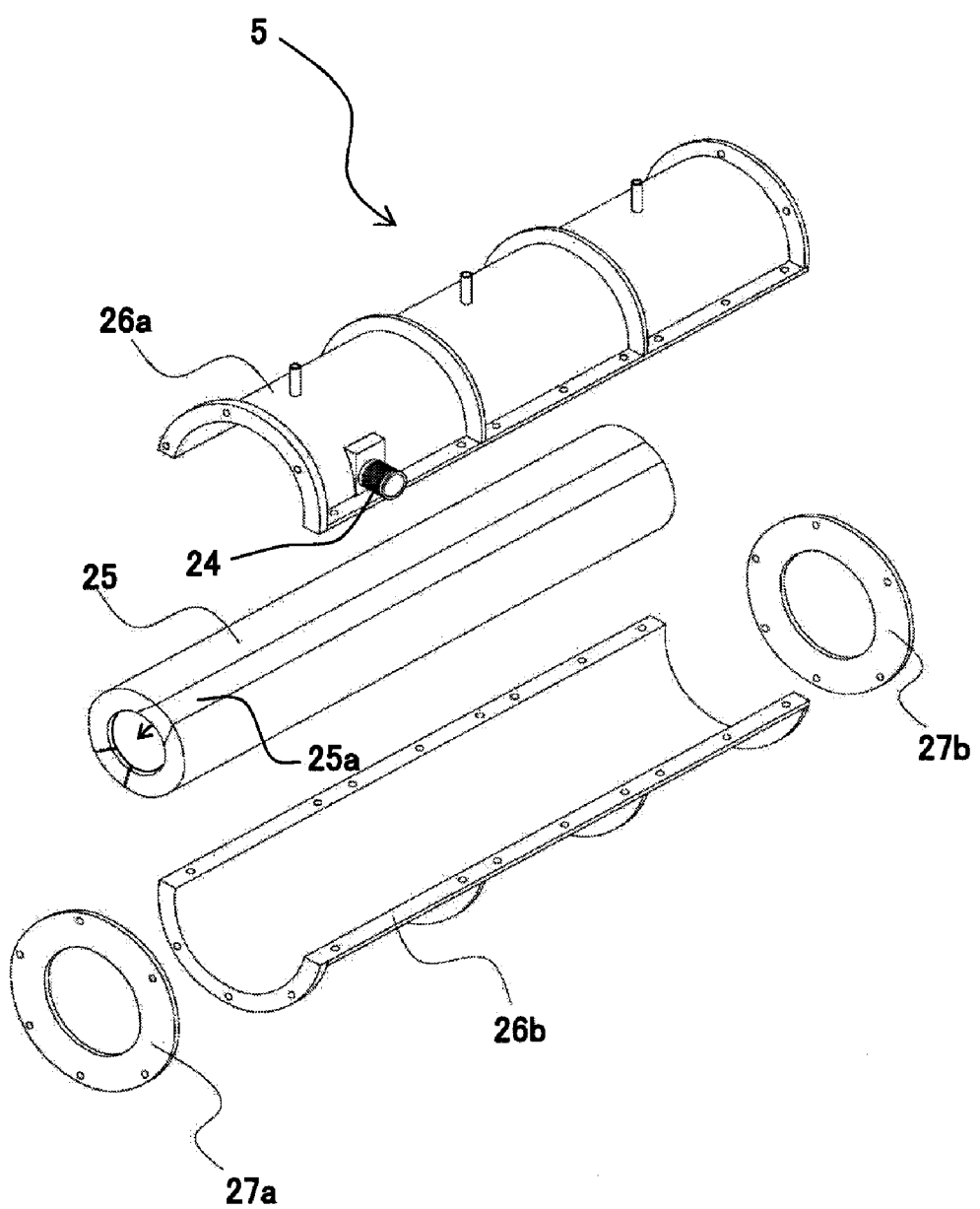
FIG. 5 is an exploded perspective view illustrating components of a mold illustrated in FIG. 1.

A concrete structure of mold 5 is described with reference to FIGS. 5 and 6. FIG. 5 is an exploded perspective view illustrating the components of mold 5 illustrated in FIG. 1. Mold 5 has a cavity which is communicated with injection port 24 and can be hermetically sealed, and has an air-release hole communicated with the cavity. Mold 5 is heated to a temperature within the preset temperature range, and has an inner mold 25, outer molds 26a and 26b as two members, and two end planks 27a and 27b.

Inner mold 25 specifies the inner peripheral surface of a cylindrical product to be manufactured and is made by a member whose outer peripheral surface is formed in a columnar shape with predetermined length. By moving a part 25a of the member extending in the longitudinal direction to the inside, entire inner mold 25 can be narrowed to the inside. Outer molds 26a and 26b specify the outer peripheral surface of the cylindrical product to be manufactured. Each of outer molds 26a and 26b is made by a member having an inside diameter larger than the outside diameter of inner mold 25 and formed in a cylindrical shape with predetermined length. Outer molds 26a and 26b can be divided into two half cylindrical members along the longitudinal direction. They may be divided into three or more members. Further, end planks 27a and 27b specify both end faces of the cylindrical product to be manufactured. Each of end planks 27a and 27b is formed in a donut shape or a circular plate shape having the outside diameter larger than that of each of outer molds 26a and 26b. End planks 27a and 27b are disposed at both ends of inner mold 25 and outer molds 26a and 26b.

Figure 6:
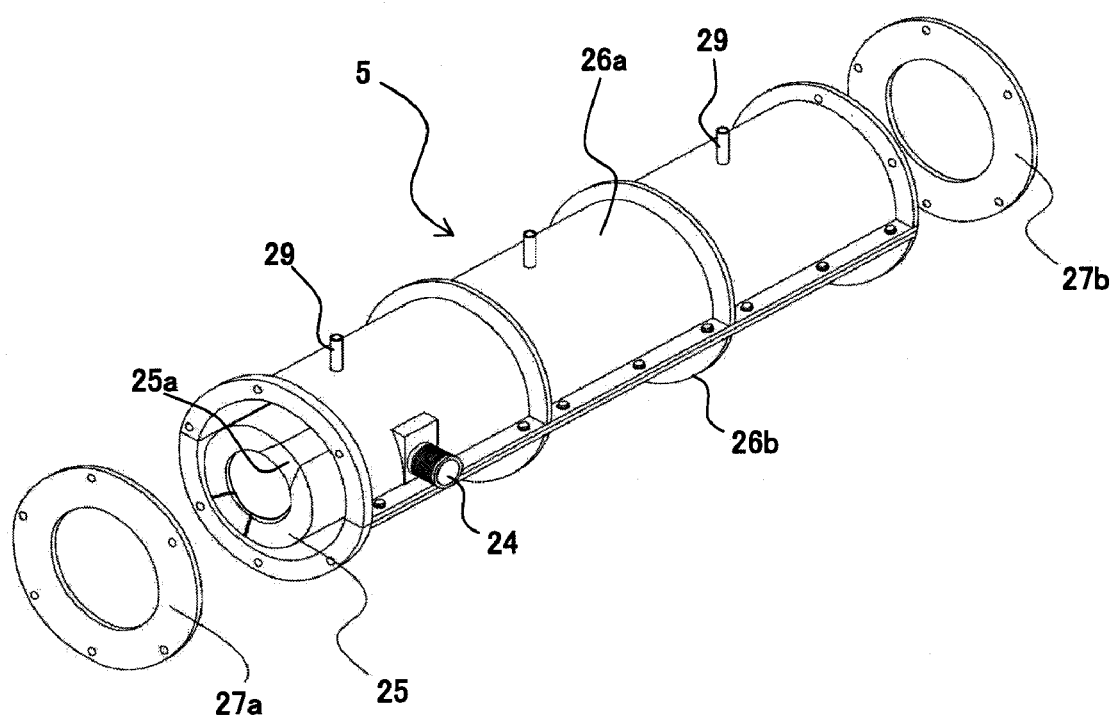
FIG. 6 is an exploded perspective view illustrating the structure of the mold illustrated in FIG. 1.

As illustrated in FIG. 6, inner mold 25 whose outer peripheral surface is formed in a columnar shape is covered with outer molds 26a and 26b as two half cylindrical members. Inner mold 25 and outer molds 26a and 26b are combined in a cylindrical shape by bolts, nuts or the like. Two end planks 27a and 27b are disposed at both ends of outer molds 26a and 26b. Both ends of inner mold 25 are fit in center openings of donut plate shapes of end planks 27a and 27b, and end planks 27a and 27b are fixed to outer molds 26a and 26b by bolts, nuts or the like. In such a manner, mold 5 illustrated in FIG. 1 is assembled.

In this state, in a space surrounded by inner mold 25, outer molds 26a and 26b, and end planks 27a and 27b, a cavity 28 (refer to FIG. 9) which is communicated with injection port 24 and can be hermetically sealed is formed. In the top face of outer mold 26a as one of outer molds, an air-release hole 29 in a pipe shape for letting air release when a sulfur-containing material in a melt state is injected from injection port 24 into cavity 28 is provided.

The peripheral portion of outer molds 26a and 26b is provided with heating means such as an electric heater, a hot-air heater, or an oil heater and is covered with a heat insulating material. Outer molds 26a and 26b are heated to a temperature within the preset temperature range of which a lower limit is equal to or above the melting point (119° C.) of sulfur (for example, about from 135 to 150° C.). In the range, the sulfur-containing material injected in outer molds 26a and 26b is maintained in the melt state without solidifying, and is spread to entire cavity 28 surrounded by inner mold 25, outer molds 26a and 26b, and end planks 27a and 27b.

Mold 5 illustrated in FIGS. 1, 5, and 6 shows a mold shape in the case of manufacturing a cylindrical product by a modified sulfur concrete substance. In the case of manufacturing a product having a shape other than the cylindrical shape, shapes of inner mold 25, outer molds 26a and 26b, and end planks 27a and 27b may be determine in accordance with the shape of the product. When the product shape is not a pipe shape but is a plate shape, a board shape, a block shape or the like, inner mold 25 may be unnecessary.

Figure 9:
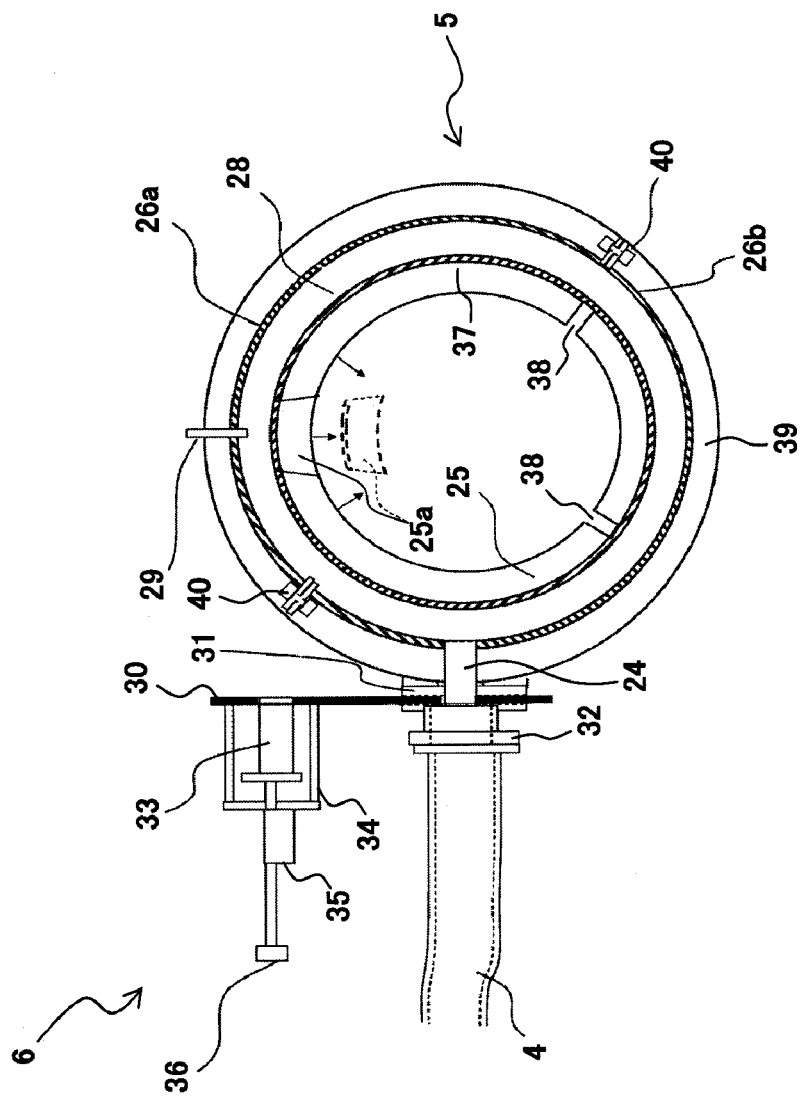
FIG. 9 is a transverse cross section view illustrating a plane orthogonal to the longitudinal direction of a mold, at a position of an injection port, for explaining a mechanism of interrupting the injection port of the mold.
Figure 10:
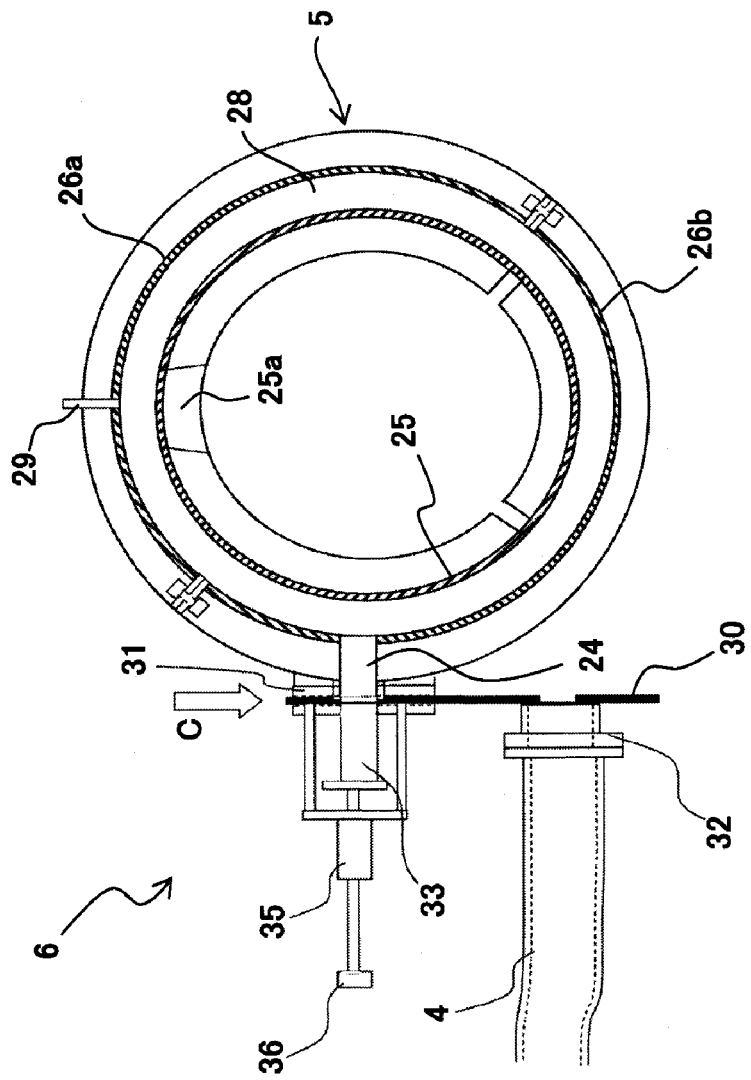
FIG. 10 is similarly a transverse cross section view illustrating a plane orthogonal to the longitudinal direction of a mold, at a position of an injection port of the mold.
Figure 11:
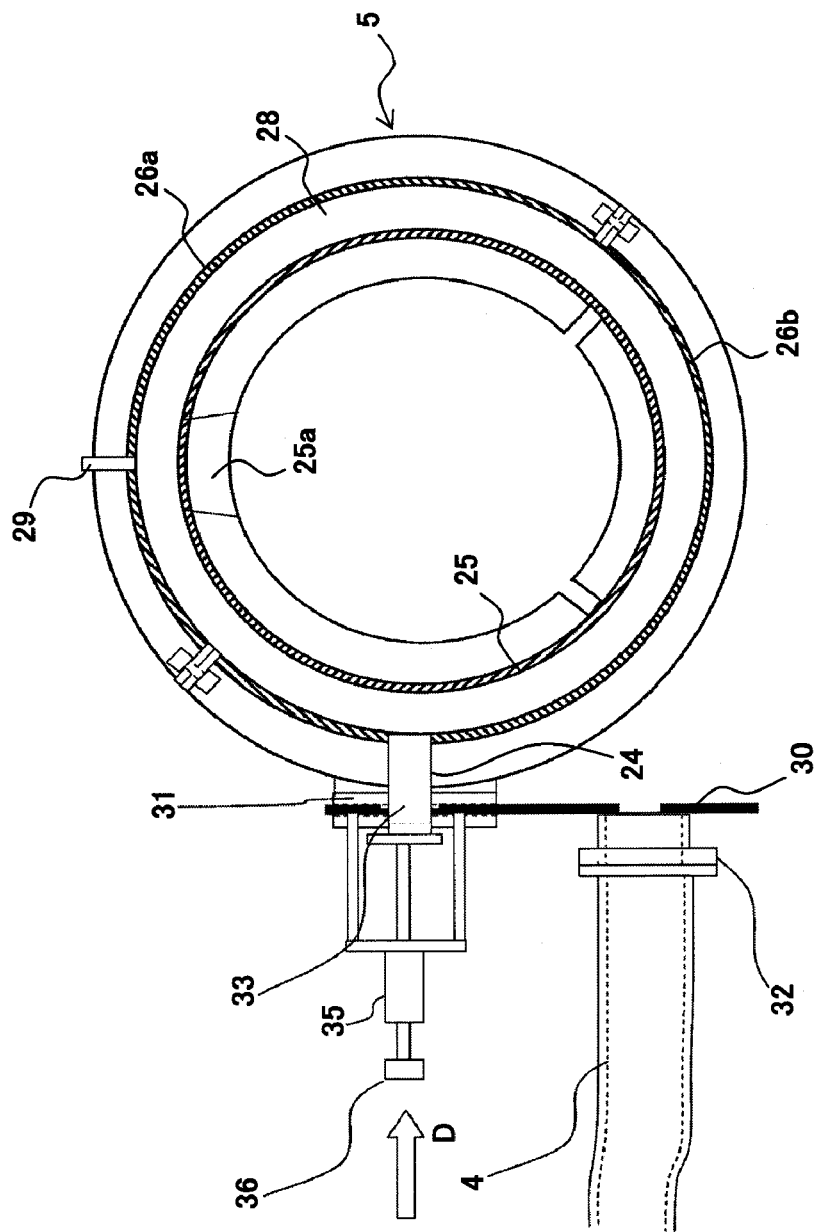
FIG. 11 is similarly a transverse cross section view illustrating a plane orthogonal to the longitudinal direction of a mold, at a position of an injection port of the mold.
Figure 12:
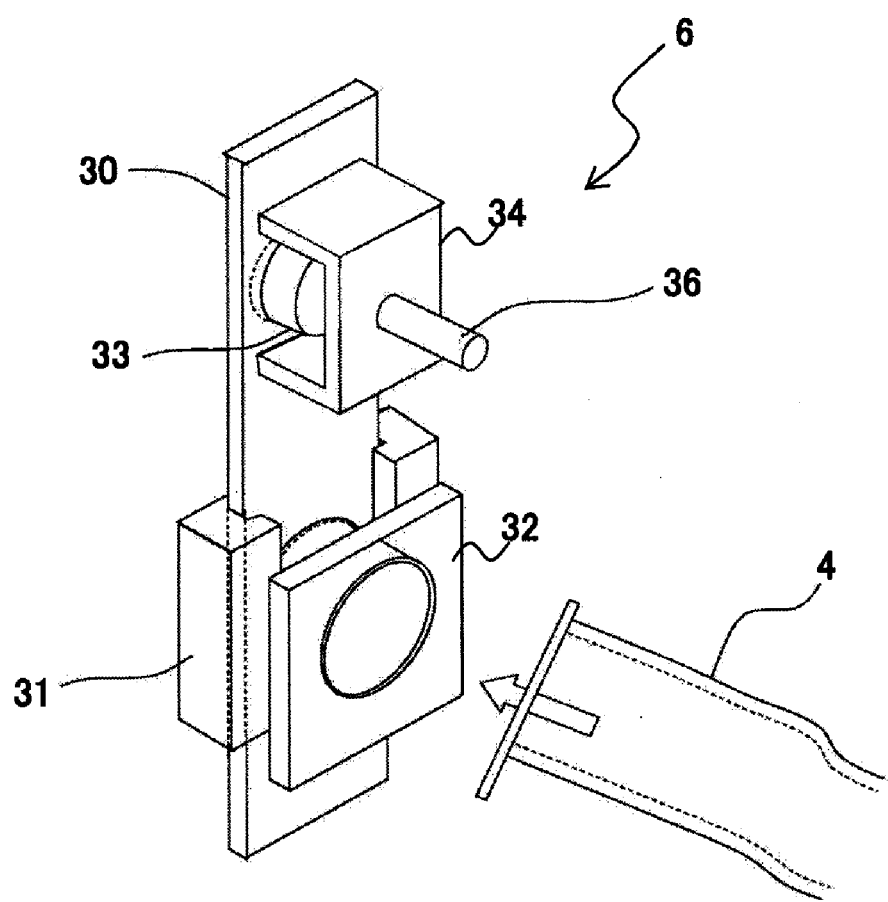
FIG. 12 is a perspective view illustrating a mechanism of interrupting the injection port of the mold.
Figure 13:
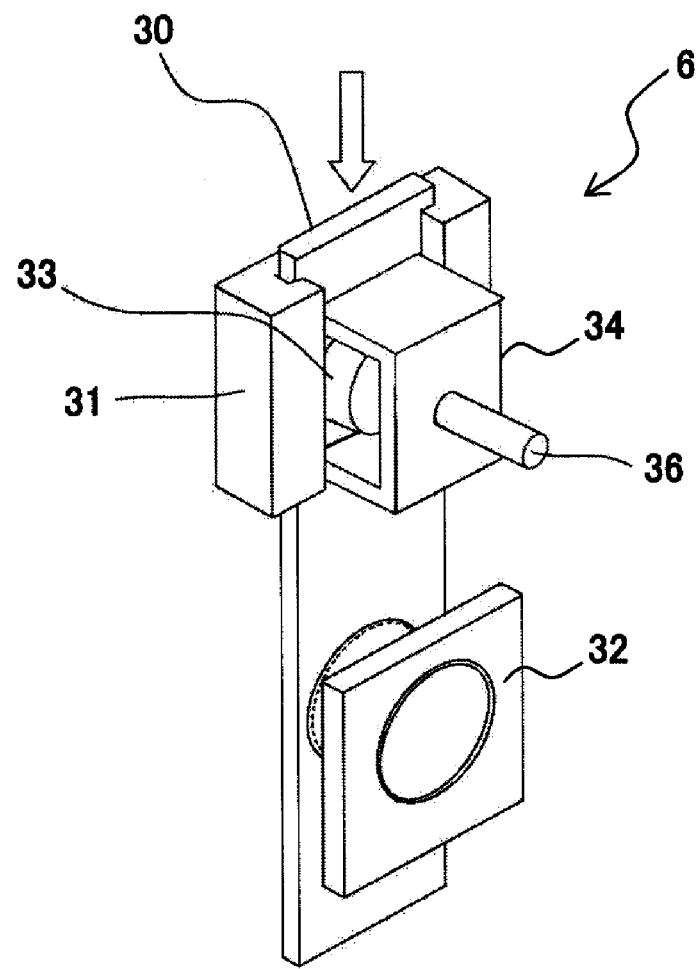
FIG. 13 is similarly a perspective view illustrating a mechanism of interrupting the injection port of the mold.

As illustrated in FIGS. 9 to 11, injection port 24 of mold 5 is provided with interrupting mechanism 6. FIGS. 9 to 11 are transverse cross section views each illustrating a plane orthogonal to the longitudinal direction of mold 5, in a position of injection port 24. Interrupting mechanism 6 closes injection port 24 after the sulfur-containing material is fully injected into cavity 28 via injection hose 4. In FIG. 9, at a position in front of injection port 24 of mold 5, an injection port opening/closing plate 30 is provided to slidably move up and down. As illustrated in FIG. 12, a guide plate 31 having hook-shaped retainers on both sides thereof is fixed in the front position of injection port 24 of mold 5, both sides of injection port opening/closing plate 30 are retained by the retainers of guide plate 31, so that injection port opening/closing plate 30 slidably moves up and down.

In FIGS. 9 and 12, a hose hook 32 for connecting the other end of injection hose 4 is attached to a lower part of injection port opening/closing plate 30. In an upper part of injection port opening/closing plate 30, a port cap 33 for closing injection port 24 of mold 5 illustrated in FIG. 9 is provided so that it can move forward or backward. In injection port opening/closing plate 30, in positions where hose hook 32 and port cap 33 are attached, through holes (refer to FIG. 9) matched and communicated with injection port 24 of mold 5 are provided. Port cap 33 is supported on the inside of an attachment fitting 34 whose side sectional shape is a U shape, and is attached at the tip of a push-in bolt 36. By rotating push-in bolt 36 in a forward or reverse direction to a nut 35 fixed to attachment fitting 34, port cap 33 can move forward or backward. The transverse sectional shape of port cap 33 is the same as that of injection port 24.

In FIG. 9, reference numeral 37 denotes a reinforcement flange attached to the inner peripheral face of inner mold 25. Reference numeral 38 denotes a notch formed in flange 37 as a clearance used at the time of narrowing entire inner mold 25 to the inside by moving a part 25a of inner mold 25 to the inside. Reference numeral 39 denotes a reinforcement flange attached to the outer peripheral surface of outer molds 26a and 26b. Reference numeral 40 denotes a coupling bolt used for separating outer molds 26a and 26b to two half cylindrical members along the longitudinal direction or coupling outer molds 26a and 26b.

A state of closing injection port 24 of mold 5 by using interrupting mechanism 6 having the above configuration is described. FIG. 9 illustrates a state where the sulfur-containing material is to be injected in cavity 28 of mold 5. Injection port opening/closing plate 30 is moved upward along guide plate 31, so that the position of hose hook 32 matches the position of injection port 24 of mold 5. In this state, the other end of injection hose 4 illustrated in FIG. 1 is connected to hose hook 32 to inject a sulfur-containing material in a melt state from injection port 24 of mold 5 into cavity 28.

After the sulfur-containing material is fully injected in cavity 28, as illustrated in FIG. 10, injection port opening/closing plate 30 is moved downward as indicated by arrow C along guide plate 31 to make the position of port cap 33 match with that of injection port 24 of mold 5. In this state, as illustrated in FIG. 11, push-in bolt 36 is rotated in the forward direction to move forward as indicated by arrow D to thereby push port cap 33 in injection port 24 of mold 5. At this time, in FIG. 10, the sulfur containing material remaining in injection port 24 is pushed into cavity 28 by the push-in of port cap 33. Consequently, finishing of a portion corresponding to injection port 24 in the modified sulfur concrete substance product formed by cooling and solidifying in cavity 28 is facilitated, and the portion can be finished as a smooth plane.

The operation of the modified sulfur concrete substance producing apparatus constructed as described above and the method of producing the modified sulfur concrete substance is described. First, in FIG. 1, the sulfur-containing material in the melt state is stored in material hopper 1 heated to a temperature within a preset temperature range of which a lower limit is equal to or above the melting point (119° C.) of sulfur (for example, about from 135 to 150° C.). The sulfur-containing material stored in material hopper 1 may be agitated by agitating blades 7a and 7b provided in material hopper 1.

The sulfur-containing material stored in material hopper 1 is sucked by second pressure generator 2b to be pulled into cylinder 11b heated to the preset temperature range, and also, the sulfur-containing material already pulled in another cylinder 11a is pushed out from cylinder 11a under predetermined pressure applied by first pressure generator 2a and injected from injection port 24 into mold 5 having therein cavity 28 which can be hermetically sealed and the mold being heated to the preset temperature range.

As illustrated in FIG. 7, extensible rod 20 extends in the direction of arrow A by driving drive cylinder 21, so that through hole 17 in first opening and closing plate 3a matches pull port 15b (refer to FIG. 1) from material hopper 1 to be opened, and further, through hole 18a in second opening and closing plate 3b matches push port 16a (refer to FIG. 1) from cylinder 11a to be opened. By the operation of opening and closing plates 3a and 3b and the operation of first and second pressure generators 2a and 2b, the sulfur-containing material stored in material hopper 1 is pulled into cylinder 11b, and the sulfur-containing material already pulled in another cylinder 11a is pushed out and injected from injection port 24 into mold 5.

After the above-mentioned process, as illustrated in FIG. 8, extensible rod 20 is contracted in the direction of arrow B by driving drive cylinder 21, so that through hole 17 in first opening and closing plate 3a matches pull port 15a (refer to FIG. 1) from material hopper 1 and to be opened and further, through hole 18b in second opening and closing plate 3b matches push port 16b (refer to FIG. 1) from cylinder 11b of second pressure generator 2b to be opened. By the operation of opening and closing plates 3a and 3b and the operation of first and second pressure generators 2a and 2b, the sulfur-containing material stored in material hopper 1 is pulled into cylinder 11a of first pressure generator 2a, and the sulfur-containing material pulled in cylinder 11b of second pressure generator 2b last time is pushed out and injected from injection port 24 into mold 5. After that, the operation is repeated.

The sulfur-containing material is injected to mold 5 by, as illustrated in FIG. 1, connecting the base end of injection hose 4 to one end 23a of material introduction pipe 23 coupled to push ports 16a and 16b for the sulfur-containing material from cylinders 11a and 11b, and connecting the other end of injection hose 4 to injection port 24 of mold 5. Injection hose 4 is connected to mold 5 by, as illustrated in FIG. 9, being connected to hose hook 32 attached to a lower part of injection port opening/closing plate 30 provided at the front position of injection port 24 of mold 5. When the sulfur-containing material is injected into mold 5, air in mold 5 escapes from air-release hole 29 provided in the top face of outer mold 26a.

While the sulfur-containing material is injected into mold 5, material hopper 1, cylinders 11a and 11b of pressure generators 2a and 2b, injection hose 4 and mold 5 are heated to a temperature within a preset temperature range of which a lower limit is equal to or above the melting point (119° C.) of sulfur (for example, about from 135 to 150° C.). Consequently, the sulfur-containing material is not solidified but can be maintained in the melt state in each of the components. In the process of injecting the sulfur-containing material into mold 5, the material may be injected while applying vibrations to mold 5. In this case, even if the sulfur-containing material is a material having low flowability, the material can be injected into mold 5.

After the sulfur-containing material is fully injected in cavity 28 of mold 5, injection port 24 of mold 5 is closed. The operation of closing injection port 24 is performed by pushing port cap 33 into injection port 24 of mold 5 by using interrupting mechanism 6 illustrated in FIGS. 9 to 11. By the push-in of port cap 33, the sulfur-containing material remaining in injection port 24 is pushed against cavity 28, so that the part corresponding to injection port 24 can be finished as a smooth surface.

After that, injection hose 4 is detached from injection port 24 of mold 5, and is connected to injection port 24 of another mold 5 for manufacturing the next product.

In this state, heating of mold 5 is stopped, and the sulfur-containing material injected in cavity 28 is slowly cooled at room temperature. After a predetermined time is elapsed, as illustrated in FIG. 5, mold 5 is disassembled, and the modified sulfur concrete substance formed by cooling and solidifying the sulfur-containing material in cavity 28 is taken out from mold 5. Mold 5 is disassembled as follows. By moving a part 25a of inner mold 25 to the inside in FIG. 9, entire inner mold 25 is narrowed to the inside and separated from the modified sulfur concrete substance. Inner mold 25 is pulled out by using a dedicated jig. After that, end planks 27a and 27b at both ends are separated from the modified sulfur concrete substance. Finally, outer molds 26a and 26b are divided into two upper and lower members. In such a manner, the modified sulfur concrete substance as a product can be taken out from mold 5.

In the above description, two pressure generators 2 (2a and 2b) are provided in parallel to material hopper 1, which suck the sulfur-containing material stored in material hopper 1, pull it out into cylinder 11 heated to a temperature within the preset temperature range, and push out the sulfur-containing material pulled in cylinder 11 from cylinder 11 by applying the predetermined pressure to the material. The present invention is not limited to the arrangement, namely, only one pressure generator may be provided for material hopper 1. In this case, the operation of sucking the sulfur-containing material stored in material hopper 1 and pulling it out into cylinder 11 and the operation of pushing the sulfur-containing material pulled in cylinder 11 from cylinder 11 under predetermined pressure cannot be executed alternately. However, the basic operations can be similarly executed, and the structure can be simplified.

In the above description, in order to heat each of material hopper 1, cylinders 11a and 11b of pressure generators 2a and 2b, injection hose 4, and mold 5 to a temperature within a preset temperature range of which a lower limit is equal to or above the melting point of sulfur, heating means is provided for each of the components thereof. However, the present invention is not limited to the above, as illustrated in FIG. 1, it is also possible to surround the periphery of the components with box-shaped members 40, 41 and the like, and transmit heated air in the preset temperature range (for example, about from 135 to 150° C.) by a heated air supplying apparatus such as a jet heater, to the inside of each of the members 40, 41 and the like so as to increase the atmospheric temperature in the members 40, 41 and the like to the melting point (119° C.) of sulfur or higher. In this case, it is sufficient to only surround the periphery of each of the components by the box-shaped member 40, 41 or the like. Therefore, existing material hopper 1, cylinders 11*a* and 11*b* of pressure generators 2*a* and 2*b*, injection hose 4, and mold 5 can be used. Accordingly, it is also possible to shift to the producing of the modified sulfur concrete substance according to the present invention using an existing plant, so that increase in cost can be suppressed.

Modified sulfur concrete substance products manufactured by the modified sulfur concrete substance producing method and the producing apparatus of the present invention can be used in various industries and use fields. Examples of the products include a Hume pipe, a pipe, a manhole, a propellant pipe, an oval pipe, a segment, a box culvert, an U-shaped gutter, side gutter, a cover, a three-sided water channel, a box, a sidewalk/road boundary block, a curbstone, an L-shaped retaining wall, a flat plate, a fish bed block, a fish bank, a wave dissipating block, a base block, and the like.

It should also be understood that many modifications and variations of the described embodiments of the invention will occur to a person having an ordinary skill in the art without departing from the spirit and scope of the present invention as claimed in the appended claims.

What is claimed is:

1. A sulfur concrete substance producing apparatus, comprising:
   a material hopper heated to a temperature within a preset temperature range of which a lower limit is equal to or above a melting point of sulfur, which stores a sulfur-containing material in a melt state on the inside thereof;
   a pressure generator to pull the sulfur-containing material out of the material hopper and into a cylinder heated to a temperature within the preset temperature range, and thereafter, to push the sulfur-containing material out of the cylinder under predetermined pressure;
   an opening and closing plate provided at each of a pull port and a push port, said pull port allowing for the pulling of for pulling the sulfur-containing material out of the material hopper and into the cylinder, and said push port allowing for the pushing of the sulfur-containing material out of the cylinder, said plates interlockingly moving to thereby alternately open and close the pull port and the push port;
   an injection hose whose base end is connected to the push port for the sulfur-containing material from the cylinder, which is heated to a temperature within the preset temperature range, and in which the sulfur-containing material flows;
   a mold whose injection port of the sulfur-containing material is connected to the other end of the injection hose, which has therein a cavity in communication with the injection port and is able to be hermetically sealed, and an air-release hole in communication with the cavity, and the mold being heated to a temperature within the preset temperature range; and
   an interrupting mechanism provided for the injection port in the mold, which closes the injection port after the sulfur-containing material is fully injected into the cavity.

2. The sulfur concrete substance producing apparatus according to claim 1, wherein each of the material hopper, the cylinder of the pressure generator, the injection hose, and the mold is provided with heating means to heat the material hopper, the cylinder of the pressure generator, the injection hose, and the mold to a temperature within the preset temperature range of which a lower limit is equal to or above a melting point of sulfur.

3. The sulfur concrete substance producing apparatus according to claim 1, wherein each of the periphery of the material hopper, the cylinder of the pressure generator, the injection hose, and the mold is covered with a box-shaped member to increase atmospheric temperature in the box-shaped member to thereby heat the material hopper, the cylinder of the pressure generator, the injection hose, and the mold to a temperature within the preset temperature range of which a lower limit is equal to or above a melting point of sulfur.

4. The sulfur concrete substance producing apparatus according to claim 1, wherein a plurality of pressure generators are provided in parallel to the material hopper to thereby alternately pull the sulfur-containing material out from the material hopper and into the cylinder, and push the sulfur-containing material out from the cylinder under predetermined pressure.

5. The sulfur concrete substance producing apparatus according to claim 1, wherein the opening and closing plate is housed in a plate cover as a casing covering the periphery of the opening and closing plate in the longitudinal direction thereof except for a port for pulling out the sulfur-containing material from the material hopper and a port for pushing out the sulfur-containing material from the cylinder, and the opening and closing plate slidably moves in the plate cover.

6. The sulfur concrete substance producing apparatus according to claim 1, wherein the cylinder of the pressure generator has a structure capable of dividing into upper and lower parts along the longitudinal direction thereof.

7. The sulfur concrete substance producing apparatus according to claim 1, wherein an agitating blade which agitates the sulfur-containing material stored in the material hopper is provided on the inside of the material hopper.

* * * * *